(12) United States Patent
Vivanco et al.

(10) Patent No.: US 9,681,349 B1
(45) Date of Patent: Jun. 13, 2017

(54) METHOD AND SYSTEM FOR MANAGING TRAFFIC OFFLOAD IN A WIRELESS COMMUNICATION NETWORK BASED ON CLOSED ACCESS MODE CONDITIONS

(71) Applicant: Sprint Spectrum LP, Overland Park, KS (US)

(72) Inventors: Daniel Vivanco, Sterling, VA (US); Diego Estrella Chavez, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 106 days.

(21) Appl. No.: 14/478,392

(22) Filed: Sep. 5, 2014

(51) Int. Cl.
*H04W 36/22* (2009.01)
*H04W 28/08* (2009.01)

(52) U.S. Cl.
CPC ........... *H04W 36/22* (2013.01); *H04W 28/08* (2013.01)

(58) Field of Classification Search
CPC ..... H04W 16/14; H04W 24/00; H04W 28/08; H04W 28/16; H04W 36/14; H04W 36/22; H04W 48/08; H04W 48/18; H04W 60/005; H04W 72/1252; H04W 76/02; H04W 76/021; H04W 76/026; H04W 76/04; H04W 84/045; H04W 12/08; H04W 16/08; H04W 16/32; H04W 28/0226; H04W 36/0022; H04W 36/08; H04W 36/34; H04W 48/02; H04W 72/04; H04W 88/08; H04W 8/186; H04W 88/16; H04L 5/0091; H04L 47/122
See application file for complete search history.

(56) References Cited

U.S. PATENT DOCUMENTS

| | | | | |
|---|---|---|---|---|
| 6,490,452 | B1 * | 12/2002 | Boscovic | H04W 36/30 455/436 |
| 8,219,101 | B2 * | 7/2012 | Shin | H04L 63/104 455/422.1 |
| 8,509,785 | B2 * | 8/2013 | Nylander | H04J 11/0069 455/438 |
| 8,515,394 | B2 * | 8/2013 | Bae | H04W 12/08 455/411 |
| 8,532,652 | B1 | 9/2013 | Edara | |
| 8,611,237 | B2 * | 12/2013 | Lee | H04W 48/08 370/252 |
| 8,626,162 | B2 * | 1/2014 | Deshpande | H04W 48/16 370/329 |

(Continued)

*Primary Examiner* — Michael Thier
*Assistant Examiner* — Eric Nowlin (57) ABSTRACT

Systems and methods are described for offloading traffic in a wireless communication network. A plurality of active wireless devices in communication with a first access node may be detected. Measurement and reporting information may be received at the first access node from the wireless devices indicating proximity to a second access node. It may be determined that a loading level at the first access node has exceeded a threshold value. The second access node may be updated to operate in a closed access mode. A criteria for selecting a wireless device in communication with the first access node for traffic offload may be determined. Closed access mode information associated with the second access node may be provided to the selected wireless device. The first access node and/or a controller node may instruct the selected wireless device to communicate with the second access node.

18 Claims, 6 Drawing Sheets

(56) References Cited

U.S. PATENT DOCUMENTS

| | | | |
|---|---|---|---|
| 8,634,836 B2 | 1/2014 | Pani et al. | |
| 8,675,499 B2* | 3/2014 | Xu | H04W 36/0011 370/242 |
| 8,676,160 B2* | 3/2014 | Lim | H04L 12/2807 370/331 |
| 8,699,461 B2* | 4/2014 | Qian | H04W 36/0055 370/310.2 |
| 8,738,007 B2* | 5/2014 | Lee | H04W 74/002 370/331 |
| 8,743,829 B2* | 6/2014 | Guan | H04W 76/021 370/331 |
| 8,761,107 B2* | 6/2014 | Jin | H04L 5/0091 370/329 |
| 8,781,480 B2* | 7/2014 | Lim | H04W 36/04 370/331 |
| 8,811,317 B2* | 8/2014 | Liang | H04W 48/20 370/216 |
| 8,811,947 B2* | 8/2014 | Venkatachalam | H04W 48/02 370/338 |
| 8,811,986 B2* | 8/2014 | Venkatachalam | H04W 48/20 370/328 |
| 8,917,662 B2* | 12/2014 | Kim | H04W 28/08 370/328 |
| 8,924,535 B2* | 12/2014 | Horn | H04W 48/02 709/224 |
| 8,934,910 B2* | 1/2015 | Lee | H04W 48/02 455/438 |
| 8,934,913 B2* | 1/2015 | Centonza | H04W 36/0055 455/433 |
| 8,938,228 B2* | 1/2015 | Li | H04W 36/0083 370/331 |
| 8,942,746 B2* | 1/2015 | Catovic | H04W 48/02 455/451 |
| 8,983,462 B2* | 3/2015 | Buchmayer | H04L 63/104 455/410 |
| 9,066,268 B2* | 6/2015 | Huang | H04W 12/08 |
| 9,319,963 B2* | 4/2016 | Lunden | H04W 48/20 |
| 9,386,506 B2* | 7/2016 | Kim | H04L 12/14 |
| 9,439,060 B2* | 9/2016 | Liu | H04W 8/082 |
| 9,439,116 B2* | 9/2016 | Zhang | H04W 36/04 |
| 9,549,389 B2* | 1/2017 | Nylander | H04W 68/00 |
| 9,554,313 B2* | 1/2017 | Centonza | H04W 36/0055 |
| 2009/0264126 A1* | 10/2009 | Khetawat | H04W 12/08 455/435.1 |
| 2009/0305699 A1* | 12/2009 | Deshpande | H04W 48/16 455/434 |
| 2010/0112980 A1* | 5/2010 | Horn | H04W 48/20 455/411 |
| 2010/0112981 A1* | 5/2010 | Suh | H04W 48/14 455/411 |
| 2010/0124179 A1* | 5/2010 | Lee | H04W 48/08 370/252 |
| 2010/0161794 A1* | 6/2010 | Horn | H04W 48/02 709/224 |
| 2010/0167730 A1* | 7/2010 | Shin | H04L 63/104 455/434 |
| 2010/0210268 A1* | 8/2010 | Lim | H04W 36/04 455/436 |
| 2010/0238858 A1* | 9/2010 | Kim | H04W 4/08 370/328 |
| 2011/0058542 A1* | 3/2011 | Nylander | H04W 68/00 370/338 |
| 2011/0070867 A1* | 3/2011 | Venkatachalam | H04W 48/02 455/411 |
| 2011/0111757 A1* | 5/2011 | Venkatachalam | H04W 48/20 455/435.2 |
| 2011/0151859 A1* | 6/2011 | Lee | H04W 48/02 455/422.1 |
| 2011/0165878 A1* | 7/2011 | Nylander | H04J 11/0069 455/436 |
| 2011/0170469 A1* | 7/2011 | Watfa | H04W 48/17 370/312 |
| 2011/0171953 A1* | 7/2011 | Faccin | H04W 48/08 455/426.1 |
| 2011/0218004 A1* | 9/2011 | Catovic | H04W 48/02 455/509 |
| 2011/0237250 A1* | 9/2011 | Horn | H04W 8/20 455/433 |
| 2011/0267963 A1* | 11/2011 | Xu | H04W 36/0011 370/242 |
| 2011/0280218 A1* | 11/2011 | Huang | H04W 36/0055 370/331 |
| 2011/0287787 A1* | 11/2011 | Nagaraja | H04J 11/0069 455/456.3 |
| 2011/0294493 A1* | 12/2011 | Nagaraja | H04J 11/0069 455/422.1 |
| 2011/0310799 A1* | 12/2011 | Horn | H04W 8/082 370/328 |
| 2012/0015649 A1* | 1/2012 | Li | H04W 36/0061 455/434 |
| 2012/0064906 A1* | 3/2012 | Lee | H04W 74/002 455/450 |
| 2012/0094663 A1* | 4/2012 | Awoniyi | H04W 48/16 455/434 |
| 2012/0142328 A1* | 6/2012 | Awoniyi | H04W 36/22 455/418 |
| 2012/0157051 A1* | 6/2012 | Bae | H04W 12/08 455/411 |
| 2012/0182972 A1* | 7/2012 | Guan | H04W 76/021 370/331 |
| 2012/0207104 A1* | 8/2012 | Liang | H04W 48/20 370/329 |
| 2012/0207137 A1* | 8/2012 | Zhou | H04L 41/12 370/331 |
| 2012/0224476 A1* | 9/2012 | Jin | H04L 5/0091 370/229 |
| 2012/0264431 A1* | 10/2012 | Lee | H04W 36/0061 455/436 |
| 2012/0270553 A1* | 10/2012 | Ha | H04W 36/22 455/438 |
| 2012/0315908 A1* | 12/2012 | Li | H04W 36/0083 455/436 |
| 2013/0003697 A1* | 1/2013 | Adjakple | H04W 36/0011 370/331 |
| 2013/0044730 A1* | 2/2013 | Qian | H04W 36/0055 370/331 |
| 2013/0079021 A1* | 3/2013 | Centonza | H04W 36/0055 455/444 |
| 2013/0079049 A1 | 3/2013 | Yu et al. | |
| 2013/0084892 A1* | 4/2013 | Teyeb | H04W 4/023 455/456.6 |
| 2013/0225195 A1* | 8/2013 | Tinnakornsrisuphap | H04W 8/06 455/453 |
| 2013/0308527 A1* | 11/2013 | Chin | H04W 36/0022 370/328 |
| 2014/0011519 A1* | 1/2014 | Lee | H04W 8/24 455/456.1 |
| 2014/0016529 A1* | 1/2014 | Singh | H04W 60/00 370/312 |
| 2014/0094173 A1* | 4/2014 | Deshpande | H04W 48/16 455/435.2 |
| 2014/0106790 A1* | 4/2014 | Kakinada | H04W 68/02 455/458 |
| 2014/0274070 A1* | 9/2014 | Lim | H04W 36/04 455/444 |
| 2015/0011218 A1* | 1/2015 | Lunden | H04W 40/16 455/436 |
| 2015/0072693 A1* | 3/2015 | Centoza | H04W 36/0055 455/438 |
| 2015/0334615 A1* | 11/2015 | Zhang | H04W 36/04 370/331 |
| 2016/0183156 A1* | 6/2016 | Chin | H04W 36/0022 370/331 |
| 2016/0330664 A1* | 11/2016 | Liu | H04W 8/082 |
| 2016/0344739 A1* | 11/2016 | Xu | H04W 8/06 |

(56) References Cited

U.S. PATENT DOCUMENTS

2016/0345255 A1* 11/2016 Kim ........................ H04L 12/14
2016/0381608 A1* 12/2016 Marinier ........... H04W 36/0061
                                                                                  455/73

* cited by examiner

METHOD AND SYSTEM FOR MANAGING TRAFFIC OFFLOAD IN A WIRELESS COMMUNICATION NETWORK BASED ON CLOSED ACCESS MODE CONDITIONS

TECHNICAL BACKGROUND

Telecommunication systems, such as cellular networks or other wireless networks, use wireless signals to establish communication channels between various network devices. For example, an access node may transmit a reference signal or a pilot signal over a signal radius, and one or more wireless devices within the signal radius may attempt to establish a connection with the access node. In a heterogeneous network, a handover procedure for offloading traffic at hotspot areas can be negotiated between a source access node (e.g., strongest signal strength) and a target access node (e.g., short range, low power access node). This allows a wireless device to be served by an access node having the lowest signal path loss rather than by an access node having the strongest signal strength.

Interference can occur at the cell edge of the target access node due to the coverage and/or power mismatch between the reference signal strength of the source access node and the reference signal strength of the target access node. This interference can result in undesirable reduction in coverage, poor quality of service that dramatically decreases user experience, throughput to the wireless devices in communication with the short range access node, and handover failure.

Overview

Systems and methods are described for traffic offload in a wireless communication network. In one instance, it may be determined that a loading level at a first access node has met a criteria. A second access node in proximity to a location of the first access node may be located. The second access node may be updated to operate in a closed access mode condition. The first access node may send closed access mode information associated with the second access node to a wireless device. The communication network, based on the closed access mode information, may select the second access node for communication with the wireless device. The selected wireless device may then be instructed to communicate with the second access node.

DETAILED DESCRIPTION

Figure 1:
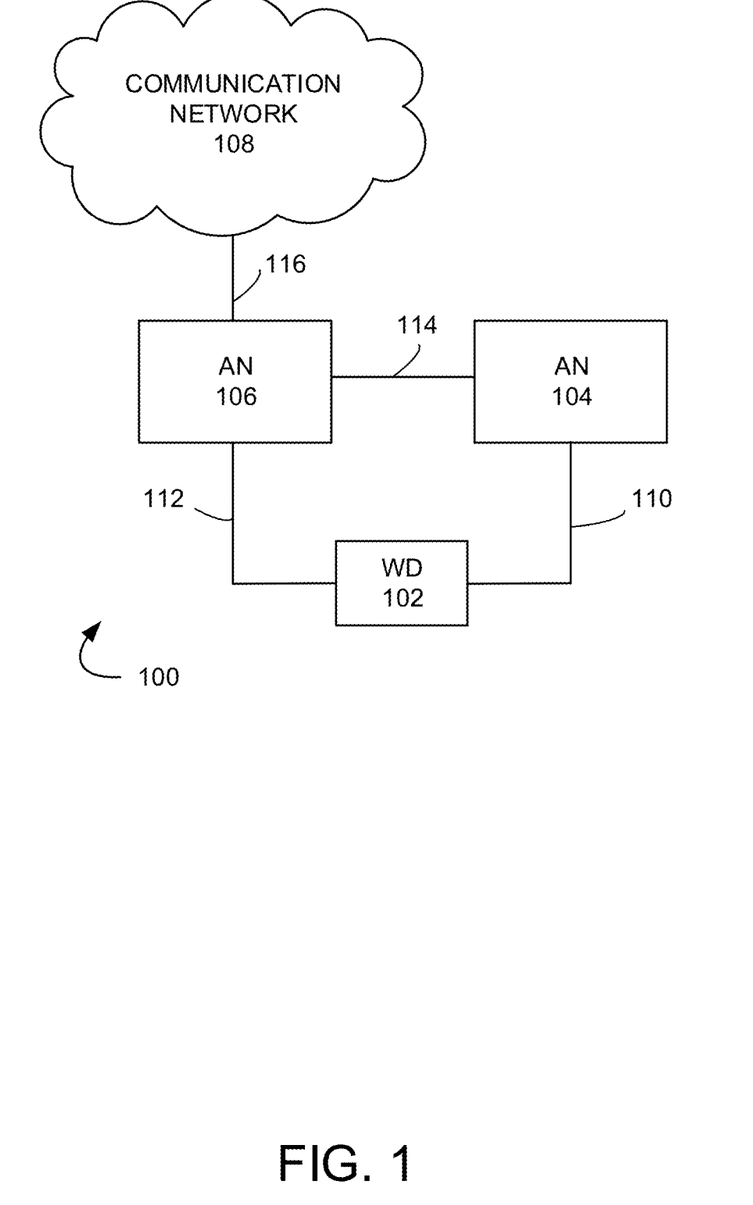
FIG. 1 illustrates an exemplary communication system for managing traffic offload in a wireless communication network.

FIG. 1 illustrates an exemplary communication system 100 for managing traffic offload in a wireless communication network. Communication system 100 can comprise a wireless device 102, access nodes 104, 106, and communication network 108. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access nodes 104, 106 and communication network 108 which are omitted for clarity, including additional processing nodes, routers, gateways, and physical and/or wireless data links for carrying data among the various network elements.

Wireless device 102 can be any device configured to communicate over system 100 using a wireless communication link. For example, wireless device 102 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with each of access nodes 104, 106 any number of wireless devices can be implemented according to various exemplary embodiments disclosed herein.

Wireless device 102 can transmit and/or receive information over system 100 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music MP3's, ring tones, stock tickers, new alerts, etc.

Access nodes 104, 106 can be any network node configured to provide communication between wireless device 102 and communication network 108. Access nodes 104, 106 can be short range access nodes or standard access nodes. A short range access node could include a microcell base station, a picocell base station, a femtocell base station, or the like and a standard access node could include a base transceiver station, a radio base station, an eNodeB device, or an enhanced eNodeB device, or the like. It is noted that while two access nodes 104, 106 are illustrated in FIG. 1, any number of access nodes can be implemented within system 100.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying data, for example, to support voice, push-to-talk, broadcast video, and data communications by a wireless device such as wireless device 102. Wireless network protocols can comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 108 comprise Ethernet, Fast Ethernet, Gigabit Ethernet, Local Talk (such as Carrier Sense multiple Access with Collision Avoidance), Token Ring, Fiber Distributed Data Interface (FDDI), and Asynchronous Transfer Mode (ATM). Communication network 108 can also comprise additional base stations, controller nodes, telephony switches, internet routers, network gateways, computer systems, communication links, or some other type of communication equipment, and combinations thereof.

Communication links 110, 112, 114, 116 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 112, 114, 116, 118 can be a direct link or might include various equipment, intermediate components, systems, and networks.

Figure 2:
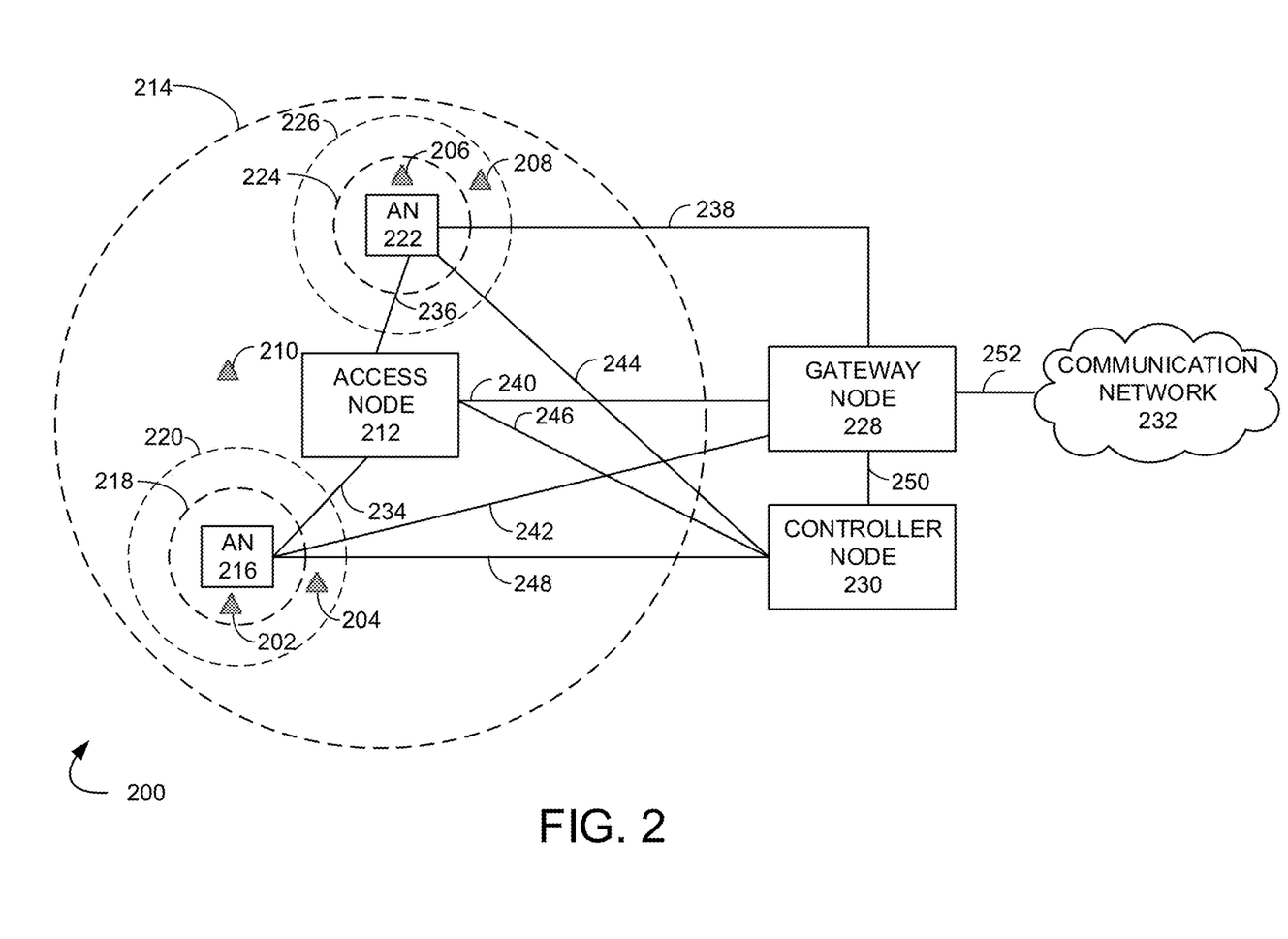
FIG. 2 illustrates another exemplary system for managing traffic offload in a wireless communication network.

FIG. 2 illustrates an exemplary communication system 200 for managing traffic offload in a wireless communication network. Communication system 200 can comprise wireless devices 202, 204, 206, 208, 210, access nodes 212, 216, 222, gateway node 228, controller node 230, and communication network 232. Other network elements may be present in the communication system 200 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between access nodes 212, 216, 222 and communication network 232, which are omitted for clarity, including additional processing nodes, routers, gateways, and physical and/or wireless data links for carrying data among the various network elements.

Wireless devices 202, 204, 206, 208, 210 can be any device configured to communicate over communication system 200 using a wireless interface. For example, wireless devices 202, 204, 206, 208, 210 can include a remote terminal unit, a cell phone, a smart phone, a computing platform such as a laptop, palmtop, or a tablet, a personal digital assistant, or an internet access device, and combinations thereof.

The wireless interface of wireless devices 202, 204, 206, 208, 210 can include one or more transceivers for transmitting and receiving data over communication system 200. Each transceiver can be associated with the same or different frequency bands, the same or different radio access technologies, the same or different network providers, and/or the same or different services. For example, wireless devices 202, 204, 206, 208, 210 can include a transceiver that is associated with one or more of the following: code division multiple access (CDMA), global system for mobile communications (GSM), worldwide interoperability for microwave access (WiMAX), long-term evolution (LTE), and/or high-speed downlink packet access (HSDPA), IEEE 802.11, wireless fidelity (Wi-Fi), Bluetooth, Zigbee, infrared data association (IrDA), multimedia broadcast multicast service (MBMS), etc.

While not illustrated in FIG. 2 for clarity, wireless devices 202, 204 can be in communication with access node 212, 216 and wireless devices 206, 208 can be in communication with access node 212, 222 through communication links. Wireless device 210 can be in communication with access node 212 through a communication link. The communication links can use various communication media, such as air, space, metal, optical fiber, or some other signal propagation path—including combinations thereof. The communication links may comprise many different signals sharing the same link. The communication links could include multiple signals operating in a single "air path" comprising beacon signals, user communications, communication sessions, overhead communications, frequencies, timeslots, transportation ports, logical transportation links, network sockets, packets, or communication directions. For example, user communication between wireless device 202 and access node 216 could share the same representative wireless link, but be transferred over different communication sessions, frequencies, timeslots, packets, ports, sockets, logical transport links, or in different directions—including combinations thereof.

Wireless devices 202, 204, 206, 208, 210 can transmit and/or receive information over communication system 200 using various communication services. These services can include various voice, data, and/or MBMS services and applications. For example, mobile voice services, mobile data services, push-to-talk services, internet services web browsing, email, pictures, picture messaging, video, video messaging, broadcast video, audio, voicemail, music, MP3's, ring tones, stock tickers, new alerts, etc.

Access nodes 212, 216, 222 can be any network node configured to provide communication between wireless devices 202, 204, 206, 208, 210 and communication network 232. Access nodes 212, 216, 222 can be standard access nodes or short range, low power access nodes. In an exemplary embodiment, access node 212 can be a standard access node having a coverage area 214. Access node 216 can be short range, low power access node having a coverage area 220 and access node 222 can be a short range, low power access node having a coverage area 226. Access nodes 216, 222 can be within at least a portion of an overlapping coverage area 214 of access node 212 where each access node 216, 222 has a coverage area that includes a cell edge portion between the full strength coverage area 218, 224 and the edge of the cell coverage area 220, 226.

A standard access node can be a macrocell access node such as a base transceiver station, a radio base station, a NodeB device, or an enhanced eNodeB device, or the like. A short range access node can include a microcell base station, a picocell base station, a femtocell base station, or the like such as a home NodeB or a home eNodeB device. In addition, a wireless device configured to enter a hotspot mode can be a femtocell access node. It is noted that while three access nodes 212, 216, 222 are illustrated in FIG. 2, any number of access nodes can be implemented within system 200.

Access nodes 212, 216, 222 can comprise a processor and associated circuitry to execute or direct the execution of computer-readable instructions to obtain information. Access nodes 212, 216, 222 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 212, 216, 222 can receive instructions and other input at a user interface.

Gateway node 228 can be any network node configured to interface with other network nodes using various protocols that communicates, routes, and forwards communication data addressed to a wireless device 202, 204, 206, 208, 210. In addition, gateway node 228 can act as a mobility anchor for wireless devices 202, 204, 206, 208, 210 during handovers between different frequencies and/or different radio access technologies supported by the same access node. Gateway node 228 can be a standalone computing device, computing system, or network component, and can be accessible, for example, by a wired or wireless connection, or through an indirect connection such as through a computer network or communication network. For example, gateway node 228 can include a serving gateway (SGW) and/or public data network gateway (PGW), etc. One of ordinary skill in the art would recognize that gateway node 228 is not limited to any specific technology architecture, such as Long Term Evolution (LTE) and can be used with any network architecture and/or protocol.

Gateway node 228 can comprise a processor and associated circuitry to execute or direct the execution of computer-readable instructions to obtain information. Gateway node 228 can retrieve and execute software from storage, which can include a disk drive, a flash drive, memory circuitry, or some other memory device, and which can be local or remotely accessible. The software comprises computer programs, firmware, or some other form of machine readable instructions, and may include an operating system, utilities, drivers, network interfaces, applications, or some other type of software, including combinations thereof. Gateway node 228 can receive instructions and other input at a user interface.

Controller node 230 can be any network node configured to communicate information and/or control information over communication system 200. Controller node 230 can be configured to transmit control information associated with a handover procedure. Controller node 230 can be a standalone computing device, computing system, or network component, and can be accessible, for example, by a wired or wireless connection, or through an indirect connection such as through a computer network or communication network. For example, controller node 230 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 230 is not limited to any specific technology architecture, such as Long Term Evolution (LTE) and can be used with any network architecture and/or protocol.

Controller node 230 can comprise a processor and associated circuitry to execute or direct the execution of computer-readable instructions to obtain information. Controller node 230 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers' network interfaces, applications, or some other type of software, including combinations thereof. Controller node 230 can receive instructions and other input at a user interface.

Access node 212 can be in communication with access node 222 through communication link 236. Access node 222 can be in communication with gateway node 228 through communication link 238. Access node 222 can be in communication with controller node 230 through communication link 244. Access node 212 can be in communication with access node 216 through communication link 234. Access node 216 can be in communication with gateway node 228 through communication link 242. Access node 216 can be in communication with controller node 230 through communication link 248. Access node 212 can be in communication with gateway node 228 through communication link 240. Access node 212 can be in communication with controller node 230 through communication link 246. Gateway node 228 can be in communication with controller node 230 through communication link 250 and in communication with communication network 232 through communication link 252.

Communication links 234, 236, 238, 240, 242, 244, 246, 248, 250, 252 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Communication links 234, 236, 238, 240, 242, 244, 246, 248, 250, 252 can be a direct link or might include various equipment, intermediate components, systems, and networks.

Communication network 232 can be a wired and/or wireless communication network, and can comprise processing nodes, routers, gateways, and physical and/or wireless data links for carrying data among various network elements, including combinations thereof, an can include a local area network, a wide area network, and an internetwork (including the Internet). Communication network 232 can be capable of carrying data, for example, to support voice, push-to-talk, broadcast video, and data communications by a wireless device such as wireless device 202. Wireless network protocols can comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 232 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 232 can also comprise additional base stations, controller nodes, telephony switches, internet routers, network gateways, computer systems, communication links, or some other type of communication equipment, and combinations thereof.

In operation, the wireless device 202 tends to connect to a stronger Reference Signal Received Power (RSRP), e.g., the source access node 212, even when the wireless device 202 is located within a coverage area of the target access node 216. When the RSRP value received from the source access node 212 is above a predefined threshold that triggers measuring and reporting for the target access node 216 handover from the source access node 212 to the target access node 216 will not be triggered. The wireless device 202 will continue to be served by the source access node 212. This may result in inefficient resource utilization between the source access node 212 and the target access node 216. Identifying a time of day that the source access node 212 is out of capacity, e.g., busy-hour, and configuring the target access node 216 to operate in a closed access mode during the busy-hour provides the communication network with the opportunity to compel traffic offload from the source access node 212 to the target access node 216. This increases traffic offload from the source access node 212 to the target access node 216 in a controllable manner and can be accomplished by updating the wireless device 202 subscription and measuring procedure for all or some of the wireless devices 202 connected to the source access node 212.

For example, handover between two access nodes 212, 216 can occur when a wireless device 202 meets a handover condition threshold. The handover condition threshold can be, for example, loading at a source access node 212 or proximity to a target access node 216. When the handover condition meets the threshold, the wireless device 202 can transmit measurement and reporting information to the source access node 212 indicating proximity to a target access node 216. In an exemplary embodiment, the wireless device 202 has a subscription to the target access node 216, e.g., the target access node 216 has a Closed Subscriber Group Identity (CSG-ID) that corresponds to a CSG-ID stored in a CSG whitelist of the wireless device 202. The wireless device 202 may use CSG-ID information broadcasted by target access node 216 for access node re-selection and handover purposes. Once the wireless device has determined it is near the target access node 216, it may provide a CSG Proximity Indication message to the communication network and source access node 212. Based on the received CSG Proximity Indication message, the communication network can select a wireless device 202 for handover to the target access node 216.

Figure 3:
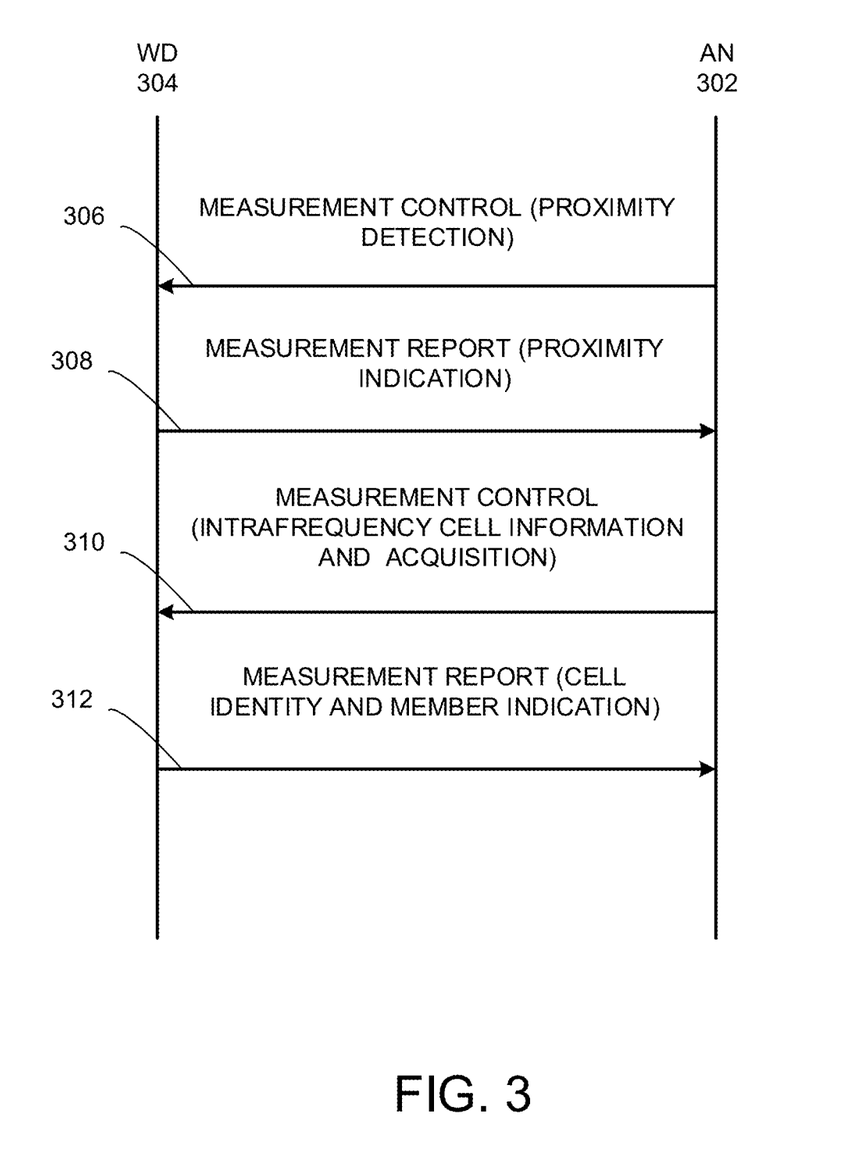
FIG. 3 illustrates a signaling diagram to illustrate a portion of an exemplary process for performing traffic offload to a closed group of access nodes in a wireless communication network.

FIG. 3 illustrates a signaling diagram to illustrate a portion of an exemplary process for performing traffic offload to a closed group of access nodes in a wireless communication network. The portion of an exemplary process for performing traffic offload illustrated in FIG. 3 can be implemented in the exemplary communication system 100 illustrated in FIG. 1, in the exemplary communication system 200 illustrated in FIG. 2, or with any suitable communication system. In addition, although FIG. 3 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

Referring to FIG. 3, a wireless device 304 may initially establish a communication link with an access node 302 (e.g., upon initialization or during a handover procedure). Data addressed to the wireless device 304 may be communicated from a controller node to the wireless device 304 via the access node 302.

At 306, an access node can configure a selected wireless device with CSG Proximity detection as a measurement type. For example, a controller node can initiate CSG Proximity Estimation reporting by the wireless device 304 by configuring the wireless device 304 to determine, based on wireless device implementation (e.g., Global Positioning System), that it is near a target access node (not shown) whose CSG-ID is in the CSG whitelist of the wireless device.

At 308, a wireless device can send an "entering/leaving CSG Proximity" message (e.g., Proximity Indication message) when it determines it may be near a target access node whose CSG-ID is in the CSG whitelist of the wireless device. For example, the wireless device 304 can provide the source access node 302 with a Proximity Indication message indicating proximity to a target access node (not shown) whose CSG-ID is in the CSG whitelist of the selected wireless device 304. The Proximity Indication message can include information of whether the selected wireless device 304 is entering or leaving a corresponding frequency associated with the source access node 302 and/or the target access node (not shown). The source access node 302 can react to the received Proximity Indication message by configuring the selected wireless device 304 to perform specific measurements and reporting.

In an exemplary embodiment, the selected wireless device 304 is allowed to send the Proximity Indication message to the source access node 302 only if the source access node 302 indicates Report Proximity Configuration via an RRC Connection Reconfiguration message.

At 310, a source access node can configure a selected wireless device with a relevant measurement configuration for a specific target access node. For example, if a measurement configuration for a target access node (not shown) is not present, the source access node 302 can configure the selected wireless device 304 with a relevant measurement configuration for the target access node (not shown).

In an exemplary embodiment, the measurement configuration for the target access node (not shown) includes a Physical Cell Identifier (PCI) associated with the target access node (not shown).

At 312, a selected wireless device can send a measurement report to the source access node. For example, the selected wireless device 304 can send a measurement report to the source access node 302. The measurement report can include, for example, a measured Physical Cell Identifier (PCI), E-UTRAN Cell Global Identifier (ECGI), CSG-ID, and a CSG membership indication of the target access node (not shown). The selected wireless device 304 can send the measurement report to the source access node 302 due to a triggered intra-frequency event. The source access node 302 can then execute handover.

Figure 4:
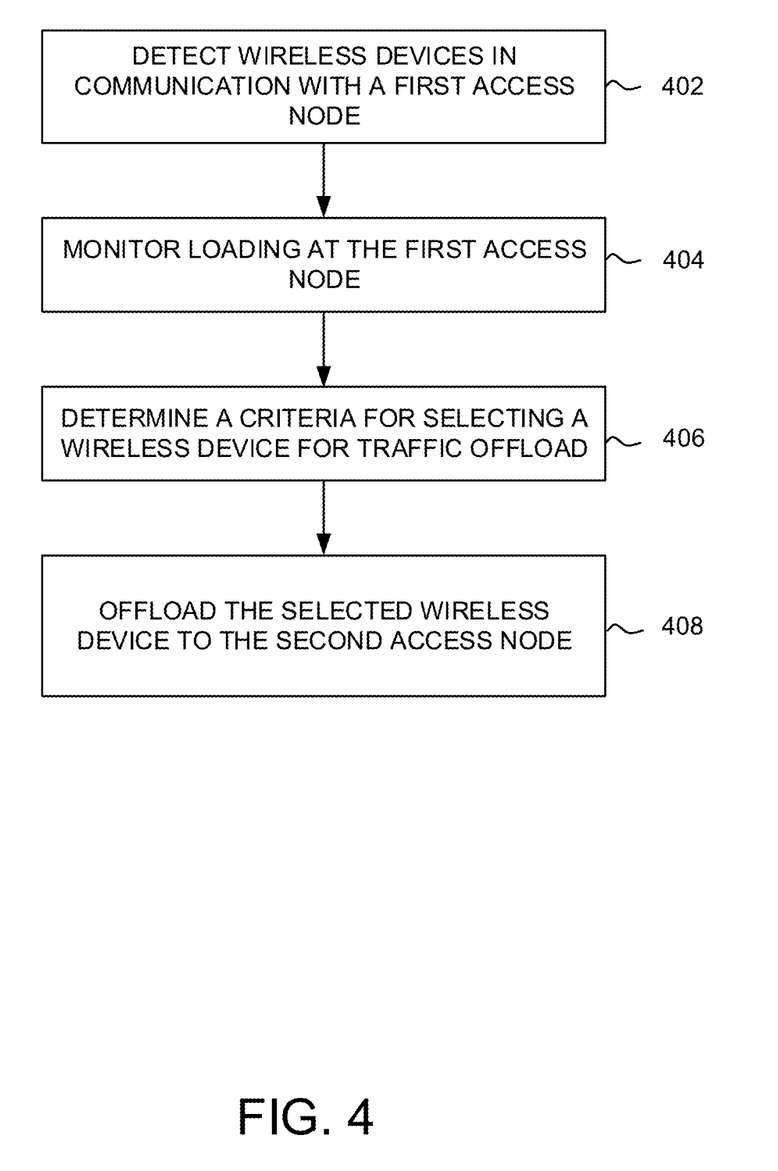
FIG. 4 illustrates an exemplary method for managing traffic offload in a wireless communication network.

FIG. 4 illustrates a flow chart of an exemplary method for managing traffic offload in a wireless communication network. The method will be discussed with reference to the exemplary communication system 200 illustrated in FIG. 2. However, the method can be implemented in the exemplary communication system 100 illustrated in FIG. 1, in the signaling diagram illustrating a portion of an exemplary process for performing traffic offload in a wireless communication network illustrated in FIG. 3, and with any suitable communication system. In addition, although FIG. 4 depicts steps performed in a particular order for purposes of illustration and discussion, the methods discussed herein are not limited to any particular order or arrangement. One skilled in the art, using the disclosure provided herein, will appreciate that various steps of the methods can be omitted, rearranged, combined and/or adapted in various ways.

Referring to FIG. 4, at step 402, a network node can detect a plurality of active wireless devices in communication with a first access node. For example, when a wireless device 202 initially establishes communication with a source access node 212 (i.e., upon initialization or during a handover procedure), a request to establish a first communication link between source access node 212 and gateway node 228 can be transmitted to controller node 230. After the first communication link is established, data addressed to the wireless device 202 can be communicated from the controller node 230 to the wireless device 202 over the first communication link via access node 212.

In an exemplary embodiment, the target access node 216 operates in an open access mode, e.g., access to the target access node 216 is not restricted to wireless devices 202 having a valid CSG subscription.

At step 404, an algorithm may be placed in the communication network 232. In an exemplary embodiment, the algorithm via the controller node 230 can monitor the loading at the source access node 212 and identify a time of day (T) that the source access node 212 is out of capacity, e.g., busy hour. The algorithm can pull the location information, e.g., Global Positioning coordinates, of the source access node 212 from the controller node 230. The algorithm may request the source access node 212 to update the target access node 216 to operate in a closed access mode. The algorithm via the source access node 212 may assign a CSG-ID to the target access node 216.

The controller node 230 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc.

At step 406, a network node can determine a criteria for selecting a wireless device in communication with the source access node. For example, the algorithm via the controller node 230 can determine a criteria for selecting a wireless device 202 in communication with the source access node 212 for traffic offload to the target access node 216. The criteria can be, for example, a valid CSG subscription to the target access node 216, the time of day, proximity to the target access node 216, a predetermined time period, signal strength (e.g., Reference Signal Received Power, usage, frequency band, load (e.g., available capacity) at the source access node 212 and/or target access node 216, consumed tonnage (e.g., heavy users may be chosen as candidates for offload before light users), wireless device mobility patterns (e.g., target access nodes with large number of transitioning wireless devices may not be selected), some other threshold condition, or any combination thereof. Once the criteria has been met, the algorithm can configure a CSG whitelist of the selected wireless device 202 to include the assigned CSG-ID of the target access node 216.

In an exemplary embodiment, the source access node 212 can configure the selected wireless device 202 with a relevant measurement configuration having "CSG Proximity detection" as a measurement type for the target access node 216, e.g., Report Proximity Configuration via an RRC Connection Reconfiguration message. The relevant measurement configuration for the target access node 216 can include a Physical Cell Identifier (PCI) associated with the target access node 216 and the location, e.g., Global Positioning System coordinates, of the target access node 216. The selected wireless device 202 can send a measurement report to the source access node 212 indicating proximity to the target access node 216. The measurement report can include, for example, a measured Physical Cell Identifier (PCI), E-UTRAN Cell Global Identifier (ECGI), CSG-ID, and a CSG membership indication of the target access node 216. The source access node 212 can then execute intra-frequency and/or inter-frequency handover of the selected wireless device 202 to the target access node 216.

At step 408, a network node can instruct a selected wireless device to communicate with the target access node. For example, the controller node 230 can instruct the selected wireless device 202 to communicate with the selected target access node 216 and the source access node 212 can proceed with intra-frequency and/or inter-frequency handover of the selected wireless devices 202.

In an exemplary embodiment, once handover of the selected wireless device 202 to the target access node 216 has been completed, the algorithm can monitor handover performance for the selected wireless device 202 via the controller node 230.

One skilled in the art, using the disclosure provided herein, will appreciate that various steps of the methods can be omitted, rearranged, combined and/or adapted in various ways and can be completed by multiple wireless devices and access nodes, for example between wireless devices 206, 208 and access node 222.

Figure 5:
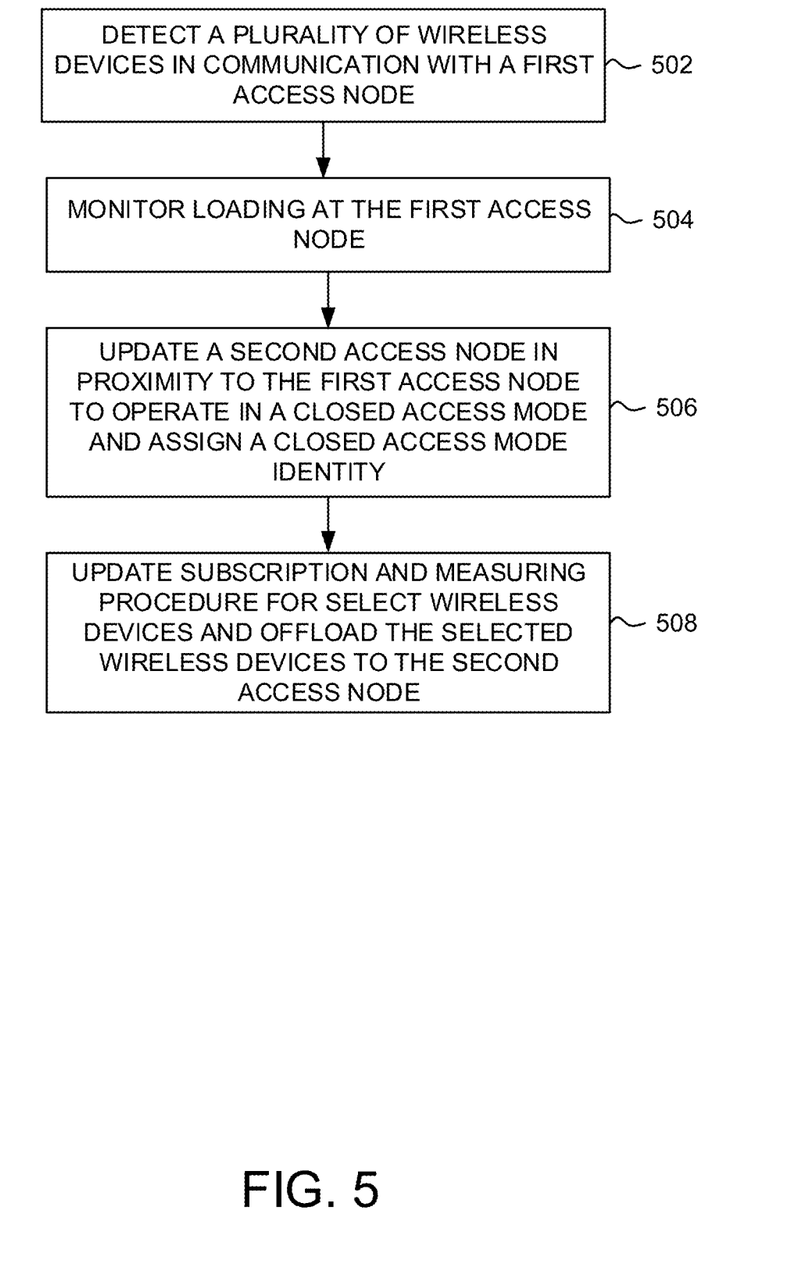
FIG. 5 illustrates another exemplary method for managing traffic offload in a wireless communication network.

FIG. 5 illustrates an exemplary method for managing traffic offload in a wireless communication network. The method will be discussed with reference to the exemplary communication system for managing traffic offload in a wireless communication network illustrated in FIG. 2. However, the method can be implemented with any suitable communication system. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

Referring to FIG. 5, at step 502, a plurality of active wireless devices in communication with a source access node are detected. For example, when a wireless device 202, 204, 206, 208, 210 initially establishes communication with a source access node 212 (i.e., upon initialization or during a handover procedure), a request to establish a first communication link between the source access node 212 and gateway node 228 can be transmitted to controller node 230. After the first communication link is established, data addressed to the wireless device 202, 204, 206, 208, 210 can be communicated from the controller node 230 to the wireless device 202, 204, 206, 208, 210 over the first communication link via the source access node 212.

In an exemplary embodiment, the target access node 216, 222 operates in an open access mode (CSG-Indicator=FALSE), e.g., access to the target access node 216, 222 is not restricted to wireless devices 202, 204, 206, 208, 210 having a valid CSG subscription. Because the target access node 216, 222 operates in an open access mode, traffic offload from the source access node 212 to the target access node 216, 222 may be a challenge due to a coverage and/or power mismatch. For example, the target access node 216, 222 may have a lower transmission power compared to the source access node 212. Consequently, in the presence of the source access node 212, the range of the target access node 216, 222 may become smaller. This occurs because the wireless device 202, 204, 206, 208, 210 tends to connect to a stronger Reference Signal Received Power ($RSRP_{Macro}$), e.g., the source access node 212, even when the wireless device 202, 204, 206, 208, 210 is located within the coverage area 218, 220 of the target access node 216, 222. The $RSRP_{Macro}$ may also be above a predefined threshold that triggers measurement and reporting for the target access node 216, 222. Intra-frequency and/or inter-frequency handover of the wireless device 202, 204, 206, 208, 210 from the source access node 212 to the target access node 216, 222 may not be triggered and the wireless device 202, 204, 206, 208, 210 will continue to be served by the source access node 212. This results in inefficient resource utilization between the source access node 212 and the target access node 216, 222.

At step 504, an algorithm monitors the load at the source access node. For example, an algorithm can be placed in the communication network 232 to monitor the volume of connected wireless devices 202, 204, 206, 208, 210 entering and/or leaving a coverage area 214 of the source access node, e.g., load information. This load information can be used to encourage/discourage source access node 212 to target access node 216, 222 offload of select wireless devices 202, 204, 206, 208, 210.

In an exemplary embodiment, the algorithm via the controller node 230 can monitor the loading at the source access node 212 and identify a time of day (T) that the source access node 212 is out of capacity, e.g., busy hour. The algorithm can pull the location information, e.g., Global Positioning System coordinates, of the source access node 212. The algorithm can correspond the location information of the source access node 212 to the time of day (T) that the source access node 212 is out of capacity.

At step 506, the algorithm updates target access nodes in proximity to the source access node to operate in a closed access mode and assigns a CSG-ID to the target access nodes. For example, the algorithm requests the source access node 212 to update a target access node 216, 222 operating in an open access mode, e.g., CSG-Indicator=FALSE, that is in proximity to the source access node 212 to operate in a closed access mode, e.g., CSG-Indicator from FALSE→TRUE. The algorithm can assign a CSG-ID to the target access node 216, 222 (CSG-ID=X).

The controller node 230 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc.

At step 508, the algorithm via the controller node requests the source access node to update the wireless device subscription and measuring procedure for select wireless devices connected to the source access node. For example, the algorithm requests the source access node 212 to update the wireless device subscription and measuring procedure for select wireless devices 202, 204, 206, 208, 210 connected to the source access node 212 (RCC_Connected).

In an exemplary embodiment, the algorithm can determine a criteria for selecting wireless devices 202, 204, 206, 208, 210 connected to the source access node 212 for traffic offload to the target access node 216, 222. The criteria can be, for example, a valid CSG subscription to the target access node 216, 222, the time of day, proximity to the target access node 216, 222, a predetermined time period, signal strength (e.g., Reference Signal Received Power, usage, frequency band, load (e.g., available capacity) at the source access node 212 and/or target access node 216, 222, consumed tonnage (e.g., heavy users may be chosen as candidates for offload before light users), wireless device mobility patterns (e.g., target access nodes with large number of transitioning wireless devices may not be selected), some other threshold condition, or any combination thereof.

In another exemplary embodiment, the algorithm can configure the CSG whitelists of the selected wireless devices 202, 204, 206, 208, 210 to include CSG-ID=X. For example, the algorithm requests the communication network 232 to update the wireless device 202, 204, 206, 208, 210 subscription data to include the CSG-ID assigned to the target access node 216, 222, e.g., update Subscriber Data. Once the subscription data has been updated, the communication network 232 provides the wireless device 202, 204, 206, 208, 210 with a context update.

In another exemplary embodiment, the source access node 212 via the controller node 230 can configure the selected wireless devices 202, 204, 206, 208, 210 with a second measurement type. For example, the source access node 212 can configure the selected wireless device 202, 204, 206, 208, 210 with a relevant measurement configuration having "CSG Proximity detection" as a measurement type for the target access node 216, 222, e.g., Report Proximity Configuration via an RRC Connection Reconfiguration message. The relevant measurement configuration for the target access node 216, 222 can include a Physical Cell Identifier (PCI) associated with the target access node 216, 222 and the location, e.g., Global Positioning System coordinates, of the target access node 216, 222. For example, the target access node 216, 222 can broadcast its CSG-ID in system information. The broadcasted CSG-ID of the target access node 216, 222 can be used by the selected wireless device 202, 204, 206, 208, 210 for re-selection and handover purposes. The selected wireless devices 202, 204, 206, 208, 210 can send a measurement report to the source access node 212 indicating proximity to the target access node 216, 222. The measurement report can include, for example, a measured Physical Cell Identifier (PCI), E-UTRAN Cell Global Identifier (ECGI), CSG-ID, and a CSG membership indication of the target access node 216, 222. The source access node 212 can then execute intra-frequency and/or inter-frequency handover of the selected wireless device 202 to the target access node 216, 222.

Note that the algorithm may remove CSG-Indicator from TRUE→FALSE and exclude CSG-ID=X from the wireless device CSG whitelist during a non-busy hour, e.g., when the source access node 212 is not out of capacity.

Note that during the busy-hour, the algorithm may need to periodically update the set of selected wireless devices 202, 204, 206, 208, 210 and target access nodes 216, 222 to fine-tune traffic offload from the source access node 212 to the target access node 216, 222. This may be done, for example, every T minutes. In an exemplary embodiment, an Internet Service Provider (ISP) may select the value of T based on observations of traffic loading at the source access node 212 and the volume of wireless devices 202, 204, 206, 208, 210 entering and/or leaving a coverage area of the source access node 212 and/or target access node 216. Wireless devices operating in idle mode are generally not selected by the algorithm. The number of target access nodes 216, 222 and wireless devices 202, 204, 206, 208, 210 selected for this adjustment may be fine-tuned to reduce the loading at the source access node 212 while avoiding overload at the target access node 216, 222.

By enabling CSG Proximity Estimation reporting for the selected wireless devices 202, 204, 206, 208, 210 it is expected that traffic offload from the source access node 212 to the target access node 216, 222 may be increased in a controllable manner.

Figure 6:
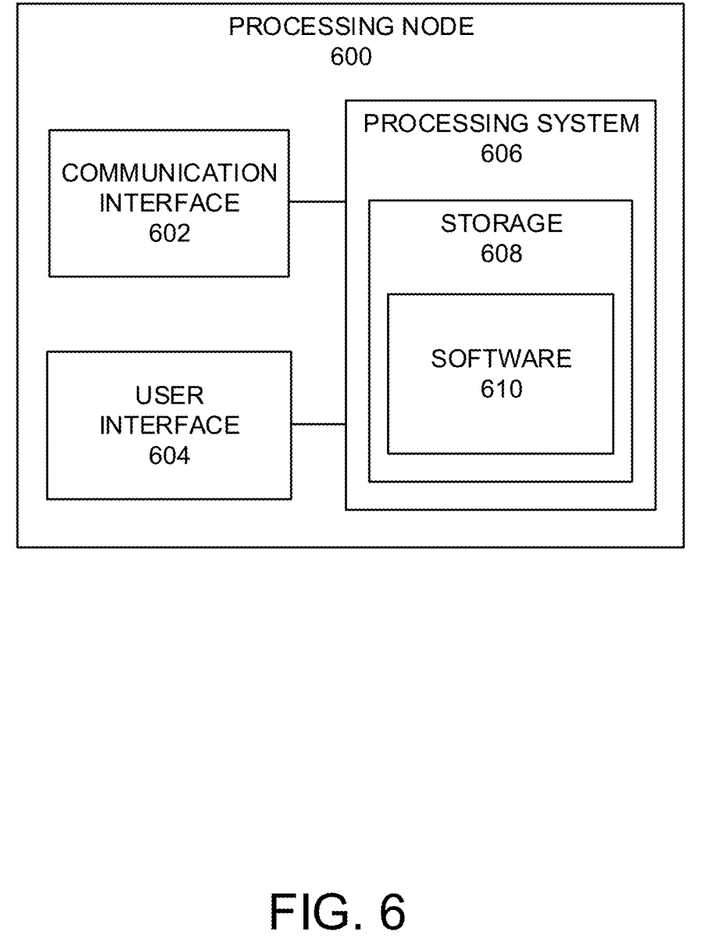
FIG. 6 illustrates an exemplary processing node.

One skilled in the art, using the disclosure provided herein, will appreciate that various steps of the methods can be omitted, rearranged, combined and/or adapted in various ways and can be completed by multiple wireless devices and access nodes FIG. 6 illustrates an exemplary processing node 600 in a communication system. Processing node 600 comprises communication interface 602, user interface 604, and processing system 606 in communication with communication interface 602 and user interface 604. Processing node 600 can be configured to determine a communication access node for a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access nodes 104, 106, 212, 216, 222 gateway node 228 and controller nodes 230. Processing node 600 can also be an adjunct or component of a network element, such as an element of access nodes 104, 106, 212, 216, 222 gateway node 228 and controller node 230. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for traffic offload, the method comprising:
monitoring a loading level at a first access node and, when the loading level at the first access node exceeds a threshold, configuring, by the first access node, a second access node to operate in a closed access mode for a predetermined period of time, the loading level being based on a number of wireless devices with subscription data other than a closed access mode identity of the second access node;
assigning a closed access mode identity to the second access node for the predetermined period of time;
selecting a set of wireless devices connected to the first access node for traffic offload to the second access node;
configuring subscription data of the selected wireless devices to include the assigned closed access mode identity of the second access node;
performing, by the first access node, an intra-frequency or inter-frequency handover of the selected wireless devices to the second access node; and
updating the set of wireless devices selected for traffic offload to the second access node periodically during the predetermined period of time based on the monitored loading level at the first access node.

2. The method of claim 1, wherein the predetermined period of time is selected based on a time of day and a loading capacity at the first access node.

3. The method of claim 2, wherein the loading capacity at the first access node is exceeded.

4. The method of claim 3, further comprising:
generating, at the first access node, an allowed list containing the assigned closed access mode identity associated with the second access node;
and
configuring the selected wireless devices with relevant measurement configuration having proximity detection as a measurement type.

5. The method of claim 4, wherein the second access node broadcasts the assigned closed access mode identity associated with the second access node in system information.

6. The method of claim 4, wherein the first access node receives measurement reports from the wireless devices that include measured control information and protocol specific data, geographic location, and a closed access mode membership indication of the second access node.

7. The method of claim 6, wherein the measurement report is received at the first access node due to a triggered intra-frequency event.

8. The method of claim 6, wherein the measurement report is received at the first access node due to a triggered inter-frequency event.

9. The method of claim 1, further comprising:
sending closed access mode information associated with the second access node to the selected wireless devices from the first access node, wherein the closed access mode information includes measured control information and protocol specific data, geographic location, and a closed access mode membership indication of the second access node.

10. The method of claim 1, wherein the second access node is deployed within a coverage area of the first access node.

11. A method for traffic offload in a wireless communication network, the method comprising:
- detecting a plurality of wireless devices in communication with a first access node;
- locating a second access node in proximity to a location of the first access node;
- determining that a loading level at the first access node has exceeded a threshold;
- configuring, by the first access node, the second access node to operate in a closed access mode for a predetermined period of time;
- selecting a wireless device based on a criteria from the plurality of wireless devices in communication with the first access node for traffic offload to the second access node;
- updating a closed access mode identity list at the selected wireless device to include an assigned closed access mode identity of the second access node, the closed access mode identity being assigned to the second access node for the predetermined time period;
- instructing the first access node to perform an intra-frequency or inter-frequency handover of the selected wireless device to the second access node;
- instructing the selected wireless device to establish a communication link with the second access node; and
- updating a number of wireless devices selected for traffic offload to the second access node periodically during the predetermined time period based on the loading level at the first access node, wherein the loading level at the first access node is based on a number of wireless devices with subscription data other than a closed access mode identity of the second access node.

12. A system for offloading traffic in a wireless communication network, the system comprising:
- a first access node and a controller, the controller configured to:
  - detect a plurality of active wireless devices in communication with the first access node;
  - receive, from the wireless devices, measurement and reporting information indicating proximity to a second access node;
  - determine that a loading level at the first access node has exceeded a threshold value;
  - configure the second access node to operate in a closed access mode for a predetermined period of time;
  - select a number of wireless devices connected to the first access node for traffic offload to the second access node based on a criteria;
  - configure subscription data of the selected wireless devices to include an assigned closed access mode identity of the second access node, the closed access mode identity being assigned to the second access node for the predetermined period of time;
  - perform an intra-frequency or inter-frequency handoff of the selected wireless devices from the first access node to the second access node; and
  - update the number of wireless devices selected for traffic offload to the second access node periodically during the predetermined period of time based on the loading level at the first access node, wherein the loading level at the first access node is based on a number of wireless devices with subscription data other than a closed access mode identity of the second access node.

13. The system of claim 12, wherein the controller node is configured to provide the selected wireless devices with closed access mode proximity detection as a measurement type.

14. The system of claim 12, wherein the measurement and reporting information includes measured control information and protocol specific data and geographic location of the second access node.

15. The system of claim 14, wherein the controller node is configured to detect a location of the selected wireless device when the wireless device enters or leaves a coverage area corresponding to a frequency associated with the first access node and/or the second access node.

16. The system of claim 12, wherein the second access node is deployed within a coverage area of the first access node.

17. The system of claim 12, wherein the controller node is configured to:
- assign the closed access mode identity to the second access node; and
- generate, at the first access node, a list containing the assigned closed access mode identity associated with the second access node.

18. The system of claim 12, wherein the closed access mode identity of the second access node includes measured control information and protocol specific data, geographic location, and a closed access mode membership indication of the second access node.

* * * * *